United States Patent
Truex

(10) Patent No.: US 7,882,739 B1
(45) Date of Patent: Feb. 8, 2011

(54) WHEEL BALANCER INCORPORATING NOVEL CALIBRATION TECHNIQUE

(75) Inventor: Don A. Truex, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 697 days.

(21) Appl. No.: 11/868,945

(22) Filed: Oct. 8, 2007

Related U.S. Application Data

(60) Provisional application No. 60/850,096, filed on Oct. 6, 2006.

(51) Int. Cl.
*G01M 1/16* (2006.01)

(52) U.S. Cl. .......................... 73/460; 73/468; 301/5.21; 700/279

(58) Field of Classification Search ................... 73/460, 73/458, 462, 468, 469, 1.82; 301/5.21; 700/279
See application file for complete search history.

(56) References Cited

U.S. PATENT DOCUMENTS

| | | | | |
|---|---|---|---|---|
| 3,785,210 A * | 1/1974 | Muller | ......................... | 73/459 |
| 3,910,121 A * | 10/1975 | Curchod et al. | ............... | 73/462 |
| 4,285,240 A * | 8/1981 | Gold | ............................ | 73/462 |
| 4,336,716 A * | 6/1982 | Poppell | ....................... | 73/480 |
| 4,338,818 A * | 7/1982 | Hill et al. | ....................... | 73/462 |
| 4,423,632 A | 1/1984 | Madden et al. | | |
| 4,480,472 A * | 11/1984 | Wood | .......................... | 73/462 |
| 4,494,400 A * | 1/1985 | Hill | ............................ | 73/1.14 |
| RE31,971 E * | 8/1985 | Gold | ............................ | 73/462 |
| 4,750,361 A * | 6/1988 | Bandhopadhyay | ........... | 73/462 |
| 4,776,215 A * | 10/1988 | Curchod | ...................... | 73/462 |
| 4,891,981 A * | 1/1990 | Schonfeld | ..................... | 73/460 |
| 4,958,290 A * | 9/1990 | Kendall et al. | ................ | 73/460 |
| 5,008,826 A * | 4/1991 | Staudinger et al. | .......... | 701/124 |
| 5,396,436 A * | 3/1995 | Parker et al. | ................. | 700/279 |
| 5,969,247 A | 10/1999 | Carter et al. | | |
| 6,244,108 B1 * | 6/2001 | McInnes et al. | ................ | 73/462 |
| 6,293,147 B1 * | 9/2001 | Parker et al. | .................. | 73/462 |
| 6,439,049 B2 * | 8/2002 | Colarelli et al. | ............... | 73/460 |
| 6,631,640 B2 * | 10/2003 | Miura | ......................... | 73/462 |
| 6,854,329 B2 * | 2/2005 | Colarelli et al. | ............... | 73/462 |
| 7,328,614 B2 * | 2/2008 | Gerdes et al. | ................. | 73/461 |
| 7,574,913 B2 * | 8/2009 | Gerdes et al. | ................. | 73/468 |
| 7,717,013 B2 * | 5/2010 | Hildebrand et al. | ......... | 74/574.2 |

\* cited by examiner

*Primary Examiner*—Hezron Williams
*Assistant Examiner*—Samir M Shah
(74) *Attorney, Agent, or Firm*—Nelson Mullins Riley & Scarborough LLP

(57) ABSTRACT

A wheel balancer utilizing a novel calibration technique in which the operator must only measure and enter one dimension of the tire. By requiring the operator to measure only one dimension of the tire, the probability of introducing measurement error into the system is reduced.

6 Claims, 5 Drawing Sheets

WHEEL BALANCER INCORPORATING NOVEL CALIBRATION TECHNIQUE

PRIORITY CLAIM

This application claims the benefit of provisional application Ser. No. 60/850,096, filed Oct. 6, 2006, which is relied upon and incorporated herein by reference.

BACKGROUND OF THE INVENTION

The present invention relates generally to wheel balancing machines. More particularly, the invention relates to a wheel balancer utilizing a calibration technique that requires the user to input only one dimensional characteristic of the tire.

In a conventional electronic wheel balancer, the wheel assembly to be balanced is placed on a shaft that extends laterally from the wheel balancer chassis. The shaft is directly or indirectly coupled to an electric drive motor so that the shaft and wheel assembly mounted thereon can be rotated. Imbalance force transducers responsive to mechanical imbalances in the wheel assembly are mechanically linked to the shaft and motor. These transducers send electrical signals to a processor which performs predetermined mathematical computations in order to analyze the signals.

After the imbalance signals are processed, visual indicators are typically provided to the operator, identifying an amount of compensating weight that should be added to the tire and wheel assembly, as well as identifying a location or locations where correction weights should be attached. Wheel balancers of the prior art are shown and described in U.S. Pat. Nos. 4,423,632 and 5,969,247, both of which are incorporated herein by reference.

Wheel balancers require frequent calibration. In some cases, for example, daily calibration may be required. Traditionally, balancers have been calibrated as a lump system by placing a known weight at a known location in space and measuring the signal output. This requires that the operator correctly enter the wheel diameter, width and offset. Errors in measuring or entering these dimensions are carried forward to all balancing operations.

Traditionally, the assignee of the present application has utilized a two-spin methodology for calibrating a wheel balancer. The calibration tire is spun a first time with no attached weight in order to provide a baseline. For the second spin, a known weight is applied at a known location on the outer plane. Others have used a three-spin calibration, but the entry of all three dimensions (wheel diameter, width and offset) is still required.

SUMMARY OF THE INVENTION

The present invention recognizes and addresses considerations of the prior art. Accordingly, the present invention provides a wheel balancer utilizing a novel calibration technique that allows calibration by measuring and entering only one dimension (e.g., wheel diameter). The wheel balancer is then able to calculate the other two dimensions associated with the wheel assembly through subsequent spins. Once the other dimensions are determined, the wheel balancer then calculates one or more calibration constants. By using the wheel balancer to calculate two of the dimensions, instead of the operator, the probability of measurement error is reduced.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of this specification, including reference to the accompanying drawings, in which.

Figure 1:
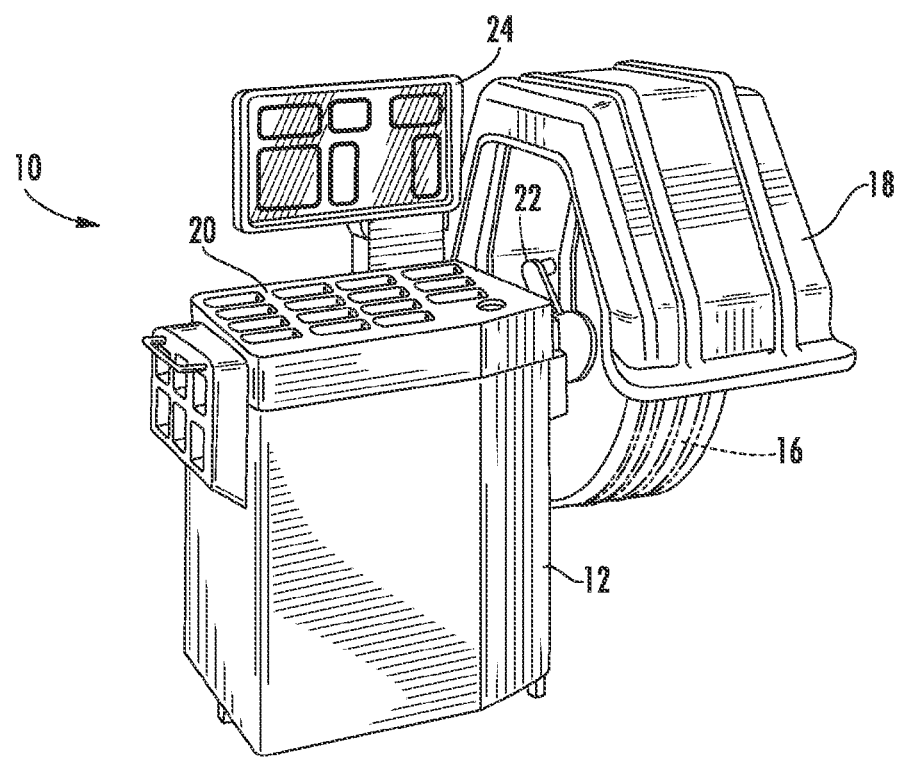
FIG. 1 is a perspective view of a wheel balancing machine in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations.

FIG. 1 illustrates a wheel balancer 10 in accordance with the present invention. A chassis 12 encloses an electric motor having a shaft 14 (FIG. 2) extending outwardly from the right side of the chassis 12. During balancing, a wheel assembly 16 is mounted to shaft 14 in a conventional manner, such as using a back cone or pressure cup secured with a hub nut. Wheel assembly 16 preferably comprises a tire 16a and a rim 16b. A protective hood 18 covers the upper portions of wheel assembly 16 during high speed rotation. Shaft 14 may be rotated by direct drive, belt drive, or any other suitable configuration.

A weight tray 20 may be located on the top of chassis 12 so that some of the various styles and sizes of weights can be stored at the balancer 10 for use by the operator. A data acquisition arm 22 may be included near shaft 14. Typically, data acquisition arm 22 is disposed parallel to and adjacent the shaft 14. Data acquisition arm 22 may conventionally include an extending and rotating rod, and a perpendicular rim contact arm affixed to an end of the rod. A roller or ball is typically disposed at the end of the rim contact arm, and is configured to provide a known contact point between the data acquisition arm 22 and the rim of tire assembly 16. An operator interface panel 24 is conventionally located above chassis 12, as shown.

One function of wheel balancer 10 is to identify to an operator locations on the rim of wheel assembly 16 to which balancing weights should be applied to correct a detected imbalance. Conventionally, data acquisition arm 22 is utilized to facilitate the weight placement process. In typical fashion, data acquisition arm 22 may be pulled toward wheel assembly 16 to gather dimensional information.

Figure 2:
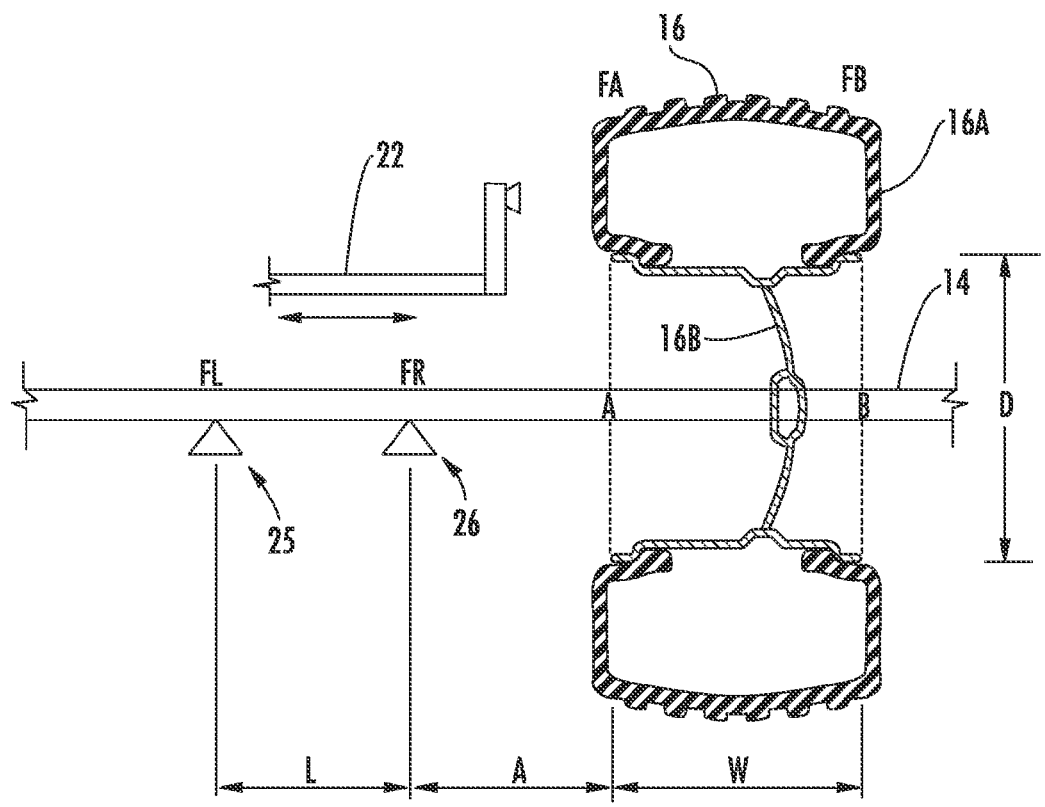
FIG. 2 is a free body diagram of a tire on a rotating shaft.

FIG. 2 shows a free body diagram of tire 16 on rotating shaft 14. Left and right force sensing transducers 25, 26 respectively measure forces generated by the shaft during rotation. Left transducer 25 generates a force designated FL and right transducer 26 generates a force designated FR. Force sensing transducers 25, 26 may be operatively connected to shaft 14 as shown, or may be configured in any other acceptable manner where vibrations of the wheel balancer may be monitored. In some embodiments, for example, force sensing transducers 25, 26 may be operatively connected to the motor.

A and B represent any plane on the tire where corrective weights are attached. As shown in FIG. 2, for example, points A and B lie in the same plane as the wheel flanges, whereas FA and FB designate the forces acting on the planes. Distance L is a known constant representing the distance between the force sensing transducers 25, 26. Distance A (offset) is the distance from right transducer 26 to the inner planes of tire 16. Distance W (width) is the distance between the inner and outer plane of tire 16.

Figure 3:
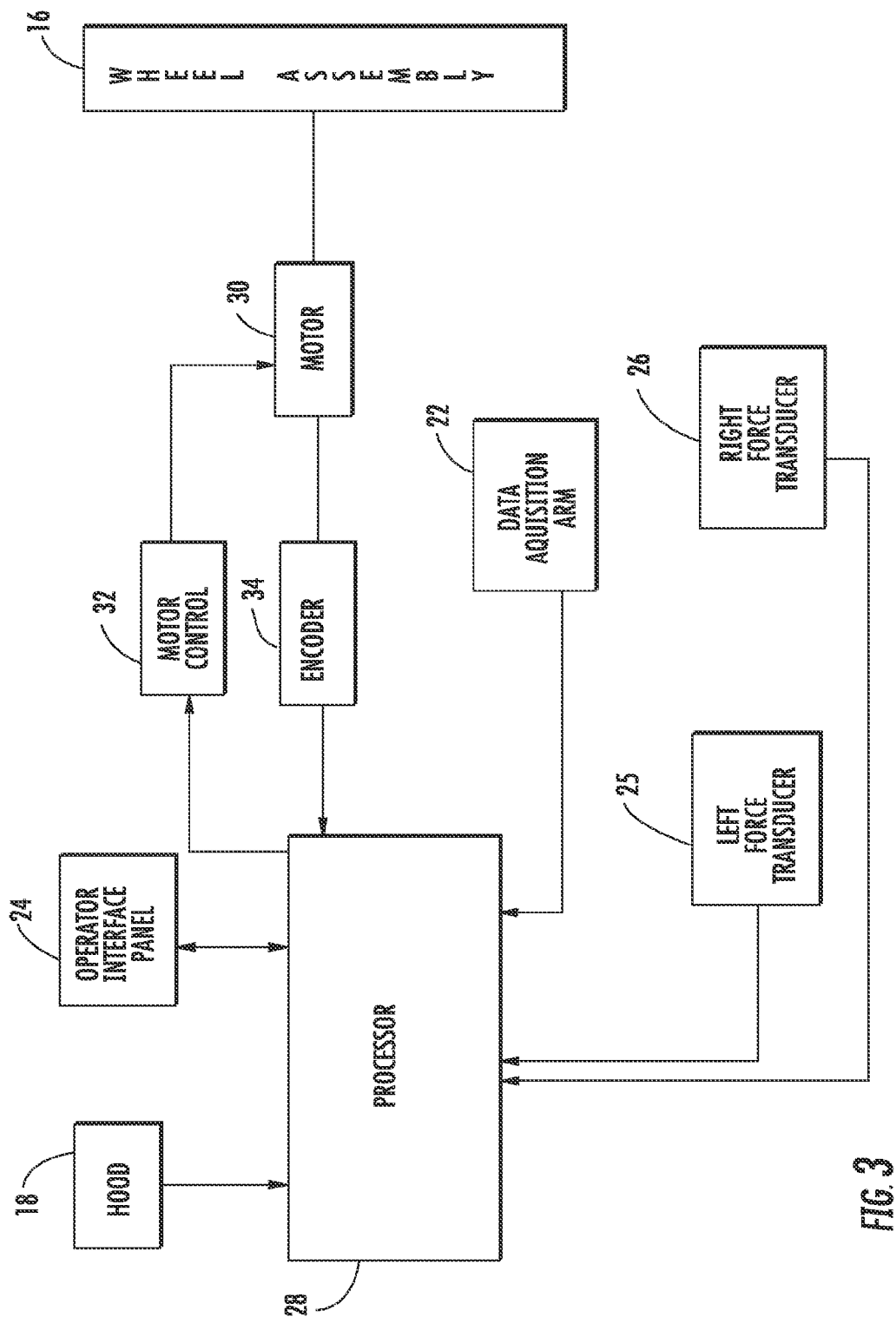
FIG. 3 is a block diagram of the electronic components utilized in the wheel balancing machine of FIG. 1.

The electronic components of wheel balancer 10 are shown in FIG. 3. Processor 28 controls the operation of wheel balancer 10. Processor 28 receives signals from operator interface panel 24 and may also receive signals from other devices, such as hood 18 and data acquisition arm 22. During operation, a motor control 32 is instructed by processor 28 to spin wheel assembly 16 using motor 30. The rotational position of wheel assembly 16 is provided to processor 28 by encoder 34. Force sensing transducers 25, 26 provide signals to processor 28 indicative of the imbalance characteristics of wheel assembly 16. Signals from force sensing transducers 25, 26 may be provided directly to processor 28 or may first receive additional conditioning or processing.

Assuming the system is in equilibrium and summing the moments around point A yields Equation 1:

$$-FL(L+A)-FR(A)+FB(W)=0 \qquad \text{Eq. 1}$$

Solving Equation 1 for FB results in Equation 1a:

$$FB = \frac{FL(L+A)}{W} + FR\left(\frac{A}{W}\right) \qquad \text{Eq. 1a}$$

Summing the moments around point B yields Equation 2:

$$-FL(L+A+W)-FR(A+W)-FA(W)=0 \qquad \text{Eq. 2}$$

Solving Equation 2 for FA results in Equation 2a:

$$FA = \frac{-FL(L+A+W)}{W} - FR\left(\frac{A+W}{W}\right) \qquad \text{Eq. 2a}$$

Using Equations 1a and 2a, along with the forces measured at FL and FR during the first spin of the wheel assembly, the imbalance force exerted by a tire at points A and B can be calculated. These forces at points A and B can then be canceled by placing weights on the tire that exert a force equal in magnitude but in the opposite direction to the imbalance force created by the rotating wheel assembly.

It is noted that all forces presented in the equations included herein are vector quantities. Accordingly, when appropriate, vector arithmetic is used for mathematical computations.

Force (F) exerted by a mass (m) is known to be defined by mass (m) multiplied by acceleration (a):

$$F=m \cdot a$$

If a body is rotating, the acceleration (a) at a point rotating about an axis is known to be a function of the radius (r) and the angular velocity ($\omega$). Specifically, the equation for angular acceleration is:

$$a=\omega^2 \cdot r$$

The weight (w) of an object is function of the object's mass (m) and the acceleration due to gravity (g).

$$w=m \cdot g$$

Using these known relationships, the force exerted by a weight spinning around an axis is shown in Equation 3:

$$F = \left(\frac{w \cdot \omega^2 \cdot r}{g}\right) \qquad \text{Eq. 3}$$

The forces at FL and FR (FIG. 2) are determined by measuring the voltage signals from the transducer, VL and VR, respectively, and multiplying those forces by a calibration constant for the left (CL) and right (CR) sensing transducers. The calculation for the FR is shown by Equation 4:

$$FR=VR \cdot CR \qquad \text{Eq. 4}$$

The calculation for the FL is shown by Equation 5:

$$FL=VL \cdot CL \qquad \text{Eq. 5}$$

Summing moments around the points at FL and FR, solving for FL and FR, and substituting Equations 4 and 5 for FR and FL yields Equations 6 and 7:

$$VL \cdot CL = FA\left(\frac{A}{L}\right) + FB\left(\frac{A+W}{L}\right) \qquad \text{Eq. 6}$$

$$VR \cdot CR = -\left(FA\left(\frac{L+A}{L}\right) + FB\left(\frac{L+A+W}{L}\right)\right) \qquad \text{Eq. 7}$$

Calibration Procedure

Figure 4:
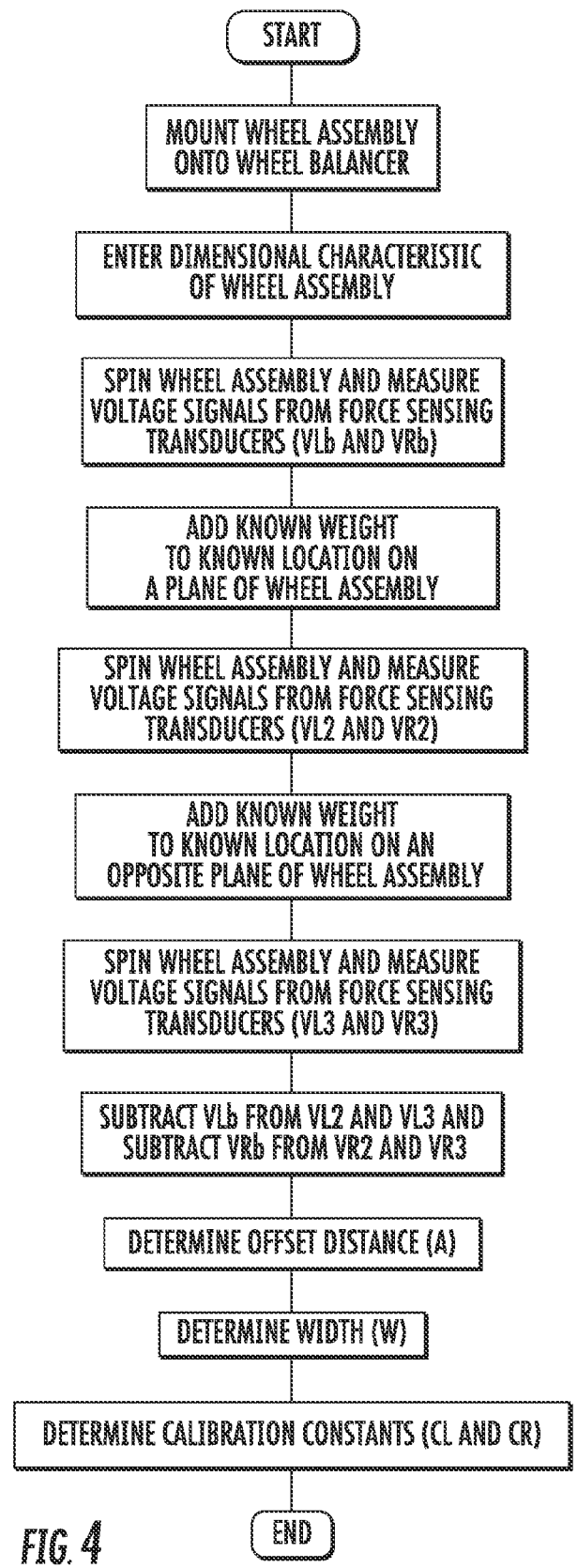
FIG. 4 is a flow chart showing a sequence of calibration steps in accordance with an aspect of the present invention.

The calibration method disclosed herein eliminates the requirement of measuring and entering two of the three dimensions required in the prior art, such as offset distance (A) and width (W). As seen in FIG. 4, the calibration method may preferably comprise the following steps:

First, the operator mounts wheel assembly 16 onto wheel balancer 10 and measures and enters a dimensional characteristic, such as the wheel's diameter (D), into the wheel balancer.

Next, the operator causes wheel balancer 10 to spin the wheel assembly 16. Voltage signals, VL and VR, at left transducer 25 (proximal) and the right transducer 26 (distal) are measured. The values of these voltage signals are proportional to the tire imbalance and will herein be referred to as baseline values, VLb and VRb, respectively.

The operator then adds a first known weight at a known location on one plane, such as the inner rim flange, and instructs wheel balancer 10 to spin wheel assembly 16 and measure the voltage signals VL2 and VR2 at the left and right transducers, respectively. After the second spin, the operator adds a second known weight at a known location on the opposite plane, such as the outer rim flange, and instructs wheel balancer 10 to spin wheel assembly 16 and measure the voltage signals VL3 and VR3 at the left and right transducers, respectively. In some embodiments, the first known weight and the second known weight may be the same weight (such as a 4-ounce calibration weight), although other sizes of weight for each may be chosen if the calibration software is configured accordingly.

By subtracting the baseline voltage, VLb and VRb, from the voltages acquired during the second and third spins, the voltage resulting from the calibration weights added during the second and third spins can be determined. This step negates the unknown imbalance that may be present in the wheel assembly used for calibration.

Next, the measured values for the second spin voltage at the left and right transducers, VL2 and VR2, are entered into Equations 6 and 7 to yield Equations 6a and 7a. Terms that are zero have been omitted:

$$VL2 \cdot CL = FB\left(\frac{A+W}{L}\right) \qquad \text{Eq. 6a}$$

$$VR2 \cdot CR = -FB\left(\frac{L+A+W}{L}\right) \qquad \text{Eq. 7a}$$

The measured values for the third spin voltage at the left and right transducers, VL3 and VR3, are entered into Equations 6 and 7 to yield Equations 6b and 7b. Terms that are zero have been omitted:

$$VL3 \cdot CL = FA\left(\frac{A}{L}\right) \qquad \text{Eq. 6b}$$

$$VR3 \cdot CR = -FB\left(\frac{L+A}{L}\right) \qquad \text{Eq. 7b}$$

FA and FB are the forces exerted by the calibration weight and are equal in magnitude and angle. Therefore, the division of Equation 6a by 6b and 7a by 7b yields Equations 6c and 7c:

$$\frac{VL2}{VL3} = \frac{\left(\frac{A+W}{L}\right)}{\left(\frac{A}{L}\right)} = 1 + \frac{W}{A} \qquad \text{Eq. 6c}$$

$$\frac{VR2}{VR3} = \frac{\left(\frac{L+A+W}{L}\right)}{\left(\frac{L+A}{L}\right)} = 1 + \left(\frac{W}{L+A}\right) \qquad \text{Eq. 7c}$$

VL4 is arbitrarily defined as a function of VL2 and VL3:

$$VL4 = \frac{VL2}{VL3} - 1$$

Substituting VL4 into Equation 6c yields 6d:

$$VL4 = \frac{W}{A} \qquad \text{Eq. 6d}$$

VR4 is arbitrarily defined as a function of VR2 and VR3:

$$VR4 = \frac{VR2}{VR3} - 1$$

Substituting VR4 into Equation 7c yields 7d:

$$VR4 = \frac{W}{L+A} \qquad \text{Eq. 7d}$$

Dividing Equation 6d by Equation 7d yields Equation 8:

$$\frac{VL4}{VR4} = \frac{\left(\frac{W}{A}\right)}{\left(\frac{W}{L+A}\right)} = 1 + \frac{L}{A} \qquad \text{Eq. 8}$$

Solving Equation 8 for A results in Equation 9:

$$A = \frac{L}{\left(\frac{VL4}{VR4} - 1\right)} \qquad \text{Eq. 9}$$

Since distance L is known, VL4 is a function of VL2 and VL3, and VR4 is a function of VR2 and VR3, all quantities on the right hand side of Equation 9 are known and distance A can be calculated. Once distance A has been calculated, the value for distance A can be substituted into either Equation 6a or 7b. Using either one of those equations, the value for distance W can be calculated. The calibration process is then completed by using Equations 6 and 7 to solve for the calibration constants, CR and CL (shown below at Equations 10 and 11).

$$CL = \frac{FA\left(\frac{A}{L}\right) + FB\left(\frac{A+W}{L}\right)}{VL} \qquad \text{Eq. 10}$$

$$CR = \frac{-\left(FA\left(\frac{L+A}{L}\right) + FB\left(\frac{L+A+W}{L}\right)\right)}{VR} \qquad \text{Eq. 11}$$

Once CR and CL are calculated, wheel balancer 50 is calibrated.

Because the dimensions that are calculated are the width and offset to the center of mass of the attached calibration weights (rather than the flange of the wheel), this enhances accuracy in subsequent calculations of corrective weight. Appropriate adjustments to correlate the center of mass location to the flanges may also be hard-coded into the machine's programming Additionally, instead of measuring diameter (D) and calculating width (W) and distance (A), other embodiments measure either width (W) or distance (A) and then use the technique described above to calculate the remaining dimensions.

A further advantage of the above technique relates to calibrating data acquisition arm 22. Data acquisition arm 22 may be used to measure balancing plane location, such as a flange of wheel assembly 16. As data acquisition arm 22 is pulled from its resting position and placed in contact with wheel assembly 16, a signal is provided to processor 28. This signal is then converted by processor 28 to a linear distance and used in further calculations during operation. In some embodiments, other types of displacement sensors may be used, such as linear encoders or rotary encoders.

Figure 5:
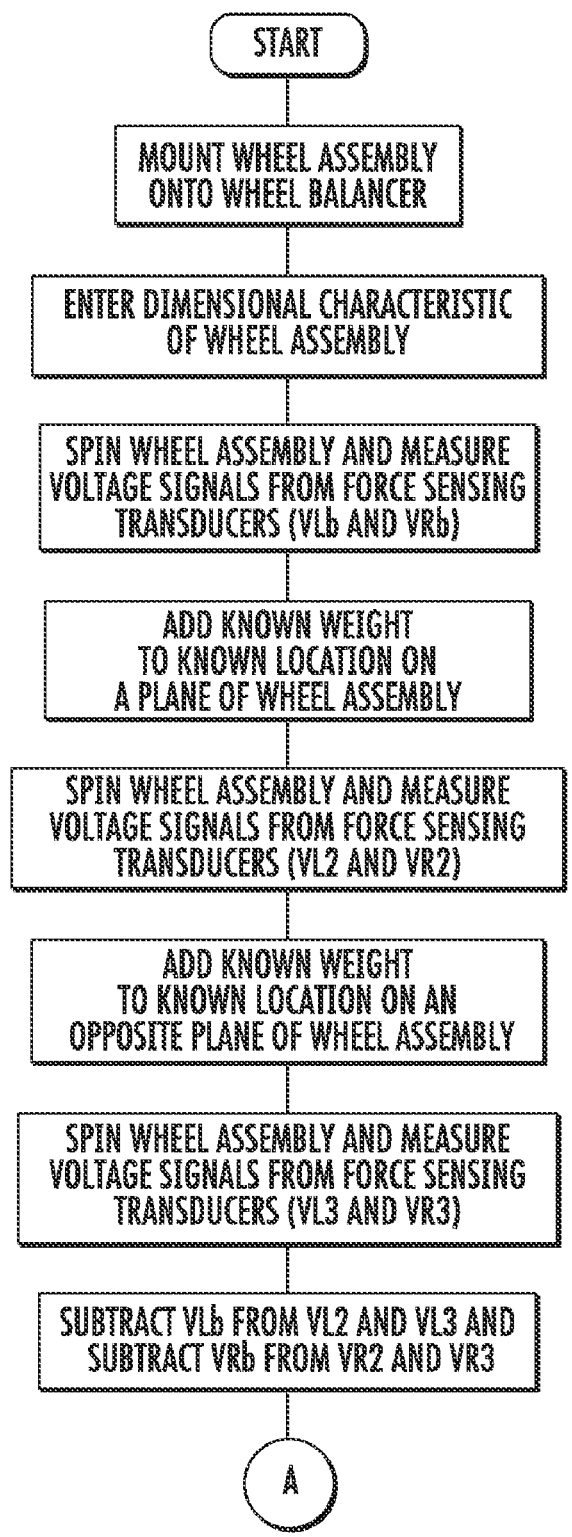
FIG. 5 is a flow chart showing a sequence of calibration steps for the data acquisition arm in accordance with an embodiment of the present invention.
Figure 5A:
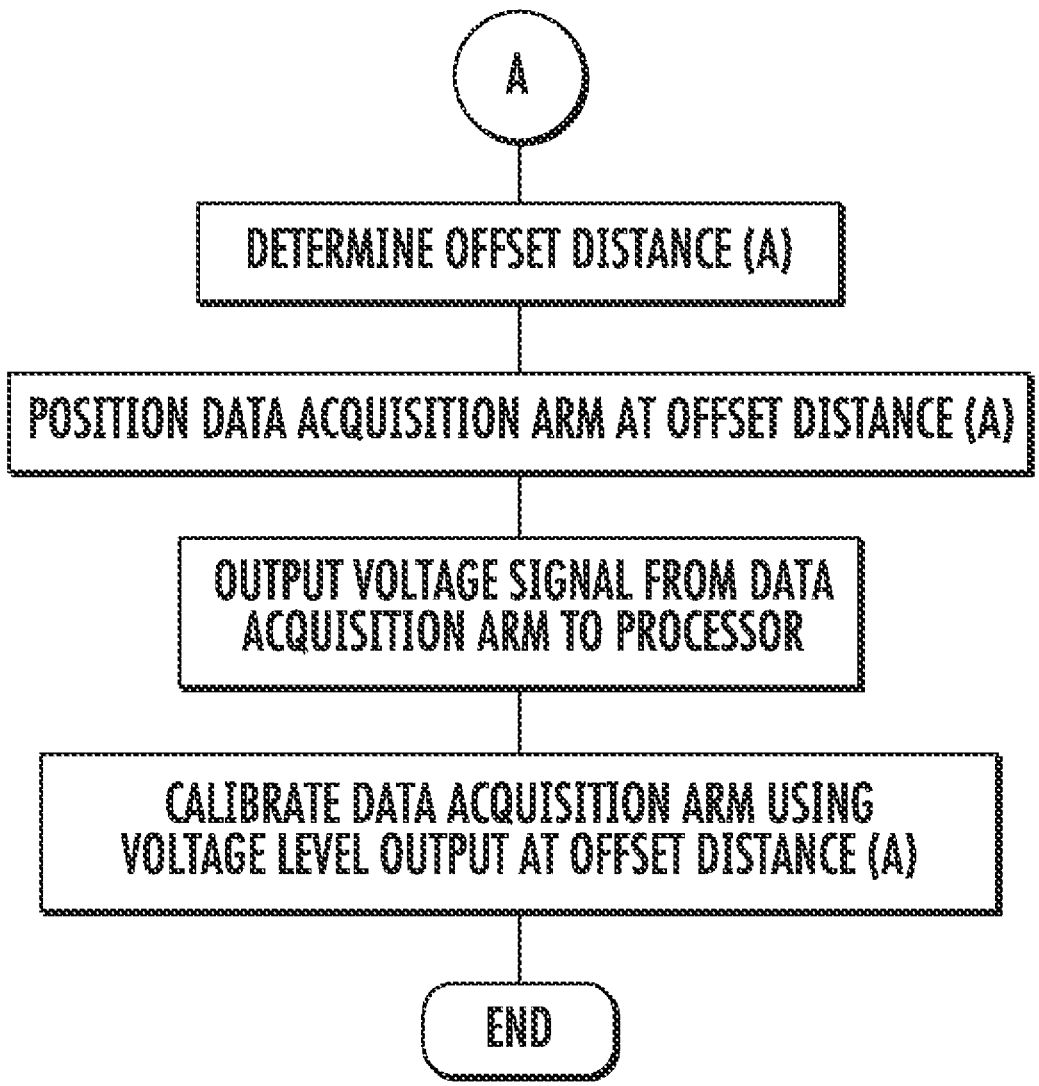
FIG. 5A is a continuation of the flow chart shown in FIG. 5.

As seen in FIGS. 5 and 5A, distance A may be used to calibrate data acquisition arm 22 using the following steps. First, distance A is calculated using the calibration technique discussed above. Next, the operator places data acquisition arm 22 at a point on wheel assembly 16 located at distance A, such as the flange. Next, data acquisition arm 22 supplies a voltage to processor 28 that is indicative of linear distance. Finally, processor 28 calibrates data acquisition arm 22 by correlating the voltage signal outputted by data acquisition arm 22 to distance A. As a result, the accuracy of data acquisition arm 22 can be enhanced without requiring higher manufacturing tolerances.

In some embodiments, the technique described herein may also be used to calculate the dimensions of a wheel assembly to be balanced. As in the calibration procedure, a wheel assembly 16 is mounted to wheel balancer 10 and a baseline measurement is taken to account for wheel assembly's 16 imbalance. The operator then places a weight of any magnitude known to wheel balancer 10 on wheel assembly and respins the wheel. This weight may be placed in either plane (the inner or outer). If the weight was placed on the outer weight plane, Equation 6 and 7 simplify to Equation 12 and 13 after subtracting the baseline spin:

$$VL \cdot CL = FB\left(\frac{A+W}{L}\right) \quad \text{Eq. 12}$$

$$VR \cdot CR = -\left(FB\left(\frac{L+A+W}{L}\right)\right) \quad \text{Eq. 13}$$

Adding Equations 12 and 13 and simplifying yields Equation 14

$$VL \cdot CL + VR \cdot CR = -FB\left(\frac{A+W-(L+A+W)}{L}\right) = FB \quad \text{Eq. 14}$$

Using the relationship in Equation 3, the radius to the center of mass of the weight added to wheel assembly 10 may be determined This value along with either equation 12 or 13 can be used to determine the value distance (A) plus width (W), or the distance to the outer weight plane. The same procedure can be used to solve for the offset value A and the radius of the inner weight placement plane by moving the weight to the inner plane and respinning wheel assembly 10. It can be seen that all dimensional information required for balancing any wheel can be accurately determined without using any external measuring devices or knowing any other information about the wheel. This procedure offers the additional benefit of improving accuracy by calculating the dimensions to the exact center of mass of the weight, as well as correcting for wheel weights of varying geometric properties and attachment methods. This technique is also advantageous on wheels where the geometry makes it difficult to measure the desired weight plane using other methods.

It can thus be seen that the present invention provides a wheel balancer utilizing a novel calibration technique. While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What is claimed is:

1. A wheel balancer for balancing a wheel, the wheel balancer comprising:
    a chassis;
    a motor;
    a shaft operatively connected to said motor, said shaft extending from said chassis for mounting a wheel assembly thereto;
    a distal transducer positioned at an offset distance from said wheel assembly, said distal transducer being operative to ascertain first imbalance information;
    a proximal transducer positioned at a known location relative to said distal transducer, said proximal transducer being operative to ascertain second imbalance information;
    a processor operative to determine an imbalance characteristic of said wheel assembly derived from said first and second imbalance information; and
    said processor being programmed to implement a calibration sequence that determines at least one calibration constant utilizing only one physical dimension of said wheel assembly as entered by a user.

2. The wheel balancer of claim 1, wherein said at least one calibration constant is a first calibration constant for said distal transducer and a second calibration constant for said proximal transducer.

3. The wheel balancer of claim 2, wherein said calibration sequence implements three sequential spin cycles.

4. The wheel balancer of claim 3, wherein said three sequential spin cycles are:
    (a) a baseline spin;
    (b) a first spin with a first calibration weight on a first plane of said wheel assembly; and
    (c) a second spin with a second calibration weight on a second plane of said wheel assembly.

5. The wheel balancer of claim 4, wherein said first calibration weight and said second calibration weight have equivalent weight magnitudes.

6. The wheel balancer of claim 1, wherein said physical dimension is a diameter of said wheel assembly.

* * * * *